United States Patent
van Rensburg et al.

(10) Patent No.: US 7,123,944 B2
(45) Date of Patent: Oct. 17, 2006

(54) APPARATUS AND METHOD FOR CONTROLLING AUXILIARY PILOT CHANNEL IN A CDMA2000 WIRELESS NETWORK

(75) Inventors: Cornelius van Rensburg, Dallas, TX (US); Purva R. Rajkotia, Plano, TX (US); John S. Csapo, Dallas, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 138 days.

(21) Appl. No.: 10/987,741

(22) Filed: Nov. 12, 2004

(65) Prior Publication Data

US 2005/0136936 A1 Jun. 23, 2005

Related U.S. Application Data

(60) Provisional application No. 60/531,498, filed on Dec. 19, 2003.

(51) Int. Cl.
*H04M 1/00* (2006.01)

(52) U.S. Cl. ............... 455/562.1; 455/561; 455/452.1; 370/442; 370/343; 375/147; 375/148

(58) Field of Classification Search ............ 455/562.1, 455/561, 452.1; 370/442, 343; 375/147, 375/148
See application file for complete search history.

(56) References Cited

U.S. PATENT DOCUMENTS

| | | | |
|---|---|---|---|
| 6,453,177 B1* | 9/2002 | Wong et al. ............. | 455/562.1 |
| 6,895,258 B1* | 5/2005 | Scherzer et al. ......... | 455/562.1 |
| 6,922,435 B1* | 7/2005 | Neufeld et al. ............. | 375/149 |
| 7,012,952 B1* | 3/2006 | Jayaraman et al. ......... | 375/148 |
| 2004/0176033 A1* | 9/2004 | Tamaki et al. ................ | 455/59 |
| 2004/0179544 A1* | 9/2004 | Wilson et al. .............. | 370/442 |
| 2005/0020295 A1* | 1/2005 | Attar et al. ................. | 455/522 |

\* cited by examiner

*Primary Examiner*—Danh Cong Le

(57) ABSTRACT

A base station for use in a wireless network capable of communicating with a plurality of mobile stations in a coverage area of the wireless network. The base station comprises a controller for controlling use of an Auxiliary Pilot channel. The controller causes the base station to i) terminate use of the Auxiliary Pilot channel in a first mode, ii) transmit data traffic to a first mobile station using the Auxiliary Pilot channel in a second mode, and iii) transmit data traffic to the first mobile station using a traffic channel phase-matched to a wide sector pilot channel signal in a third mode.

21 Claims, 4 Drawing Sheets

APPARATUS AND METHOD FOR CONTROLLING AUXILIARY PILOT CHANNEL IN A CDMA2000 WIRELESS NETWORK

CROSS-REFERENCE TO RELATED APPLICATION AND CLAIM OF PRIORITY

The present invention is related to that disclosed in U.S. Provisional Patent Application Ser. No. 60/531,498, filed Dec. 19, 2003, entitled "Forward Channel Beam-forming Using PSMM Value and Auxiliary Pilot Signal in a CDMA2000 Network". U.S. Provisional Patent Application Ser. No. 60/531,498 is assigned to the assignee of the present application. The subject matter disclosed in U.S. Provisional Patent Application Ser. No. 60/531,498 is hereby incorporated by reference into the present disclosure as if fully set forth herein. The present invention hereby claims priority under 35 U.S.C. §119(e) to U.S. Provisional Patent Application Ser. No. 60/531,498.

TECHNICAL FIELD OF THE INVENTION

The present invention generally relates to wireless networks and, more specifically, to a mechanism for controlling the use of the Auxiliary Pilot channel in a CDMA2000 network.

BACKGROUND OF THE INVENTION

Wireless communication systems have become ubiquitous in society. Business and consumers use a wide variety of fixed and mobile wireless terminals, including cell phones, pagers, Personal Communication Services (PCS) systems, and fixed wireless access devices (i.e., vending machine with cellular capability). Wireless service providers continually try to create new markets for wireless devices and expand existing markets by making wireless devices and services cheaper and more reliable. To continue to attract new customers, wireless service providers are implementing new services, especially digital data services that, for example, enable a user to browse the Internet and to send and receive e-mail.

Many of these new services are made possible by the use of smart antenna arrays that transmit data from a base station to a mobile station using beam-forming techniques. Beam-forming focuses a transmit beam in the direction of a selected mobile station and, therefore, uses much less power than conventional transmission techniques that broadcast the data in all directions at equal strength. Moreover, since the beam is focused towards a selected mobile station, the signal power is greatly reduced in other directions, thereby reducing signal interference in other mobile stations.

However, in order to use beam-forming techniques, the direction of the mobile station must be known. A variety of conventional techniques are known for estimating the direction of a selected mobile station. In some direction-estimating devices, such as the Spatial Correlator from Metawave, the estimate is based entirely on the reverse (uplink) channel. It is then assumed that the forward (downlink) channel is similar to the reverse channel. However, it is well known that in real-world environments, this often is not true, due to reflected signals in the reverse channel. See generally, U.S. Pat. Nos. 6,108,565, 6,347,234, 6,330,460, 6,501,747, 6,233,466, and 6,320,853 and U.S. patent application Ser. No. 2002/0128027 A1. Another approach of the prior art proposes continuously sweeping a narrow beam over the entire sector. The mobile station must then synchronize with a narrow beam in a specific direction and transmit data after synchronization.

Unfortunately, the prior art techniques are not very accurate, since these techniques attempt to do direction finding with accuracy of up to 1 degree with a relatively wide beam width accuracy of about 15 degrees. Also, as indicated above, the prior art techniques determine the optimum forward link beam using reverse link measurements.

Therefore, there is a need in the art for improved wireless networks that are able to accurately transmit directed beams to a target mobile station. In particular, there is a need in the art for apparatuses and methods capable of accurately estimating the direction of a mobile station in order to optimize beam-forming techniques in the forward traffic channel.

SUMMARY OF THE INVENTION

The present invention overcome the shortcomings of conventional wireless networks by using wide-beam and narrow-beam pilot signals to estimate the direction to a mobile station. In an exemplary embodiment, a sweeping Auxiliary Pilot signal and forward link-based Pilot Signal Measurement Messages are used to estimate the direction to a selected mobile station. The present invention discloses that a direction finding estimate may be done directly based on the forward link channel as perceived by the mobile station and without any modification of the mobile station.

Accordingly, to address the above-discussed deficiencies of the prior art, it is a primary object of the present invention to provide a base station for use in a wireless network capable of communicating with a plurality of mobile stations in a coverage area of the wireless network. According to an advantageous embodiment of the present invention, the base station comprises a controller for controlling use of an Auxiliary Pilot channel, wherein the controller is capable of causing the base station to i) terminate use of the Auxiliary Pilot channel in a first mode, ii) transmit data traffic to a first mobile station using the Auxiliary Pilot channel in a second mode, and iii) transmit data traffic to the first mobile station using a traffic channel phase-matched to a wide sector pilot channel signal in a third mode.

According to one embodiment of the present invention, the base station monitors reverse channel signals from the first mobile station using a RAKE receiver and the controller is capable of determining if one of a plurality of RAKE fingers of the RAKE receiver is receiving a dominant signal.

According to another embodiment of the present invention, the controller, in response to a determination that a first one of the plurality of RAKE fingers is receiving a dominant signal, causes the base station to transmit a plurality of Auxiliary Pilot channel signals to the first mobile station at different angles and wherein the controller is capable of determining a first one of the plurality of Auxiliary Pilot channel signals that is most closely phase-matched to the wide sector pilot channel signal.

According to still another embodiment of the present invention, the controller causes the base station to transmit the data traffic to the first mobile station using the traffic channel, wherein the controller configures the traffic channel using phase and power parameters similar to phase and power parameters associated with the first Auxiliary Pilot channel signal.

According to yet another embodiment of the present invention, the controller, in response to a determination that none of the plurality of RAKE fingers is receiving a dominant signal, is further capable of determining: i) a first total transmit power required to transmit data traffic to the first mobile station if the Auxiliary Pilot channel is not used and ii) a second total transmit power required to transmit data traffic to the first mobile station if the Auxiliary Pilot channel is used.

According to a further embodiment of the present invention, the controller is further capable of determining if the first total transmit power is greater than the second total transmit power.

According to a still further embodiment of the present invention, the controller, in response to a determination that the first total transmit power is greater than the second total transmit power, causes the base station to terminate use of the Auxiliary Pilot channel in the first mode.

According to a yet further embodiment of the present invention, the controller, in response to a determination that the first total transmit power is not greater than the second total transmit power, causes the base station to transmit the data traffic to the first mobile station using the Auxiliary Pilot channel in the second mode.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
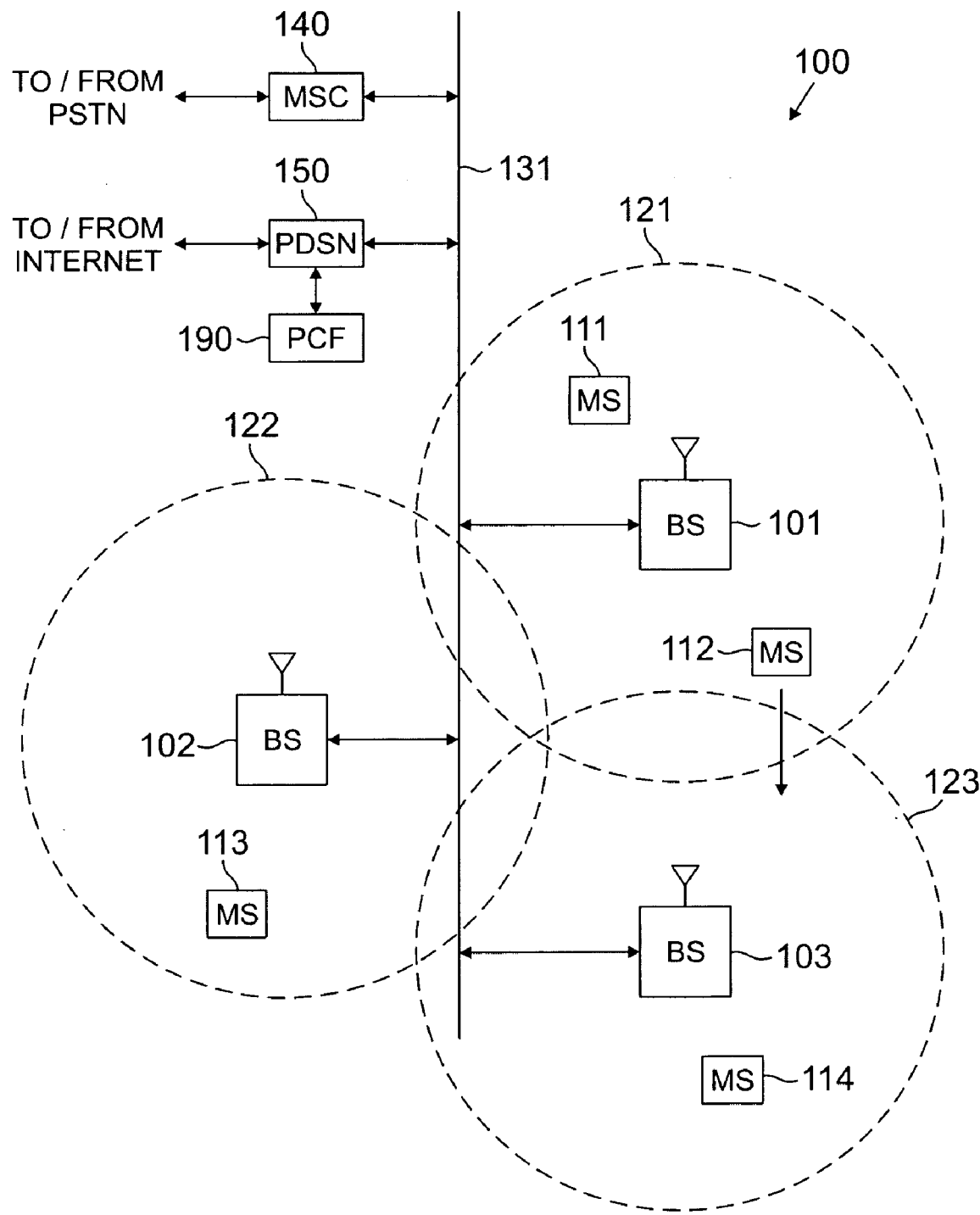
FIG. 1 illustrates an exemplary wireless network, which uses an Auxiliary Pilot (AP) channel signal to estimate the direction of a mobile station according to the principles of the present invention.

FIG. 1 illustrates exemplary wireless network 100, which uses an Auxiliary Pilot (AP) channel signal to estimate the direction of a mobile station according to the principles of the present invention. Wireless network 100 comprises a plurality of cell sites 121–123, each containing one of the base stations, BS 101, BS 102, or BS 103. In an exemplary embodiment, base stations 101–103 communicate with a plurality of mobile stations (MS) 111–114 over code division multiple access (CDMA) channels according to the cmda standards (e.g:.IS-95,Rel.0,Rel. A, Rel. B, Release C, Rel. D of cdma2000). Mobile stations 111–114 may be any suitable wireless devices, including conventional cellular radiotelephones, PCS handset devices, personal digital assistants, portable computers, telemetry devices, and the like, which are capable of communicating with the base stations via wireless links.

The present invention is not limited to mobile devices. Other types of wireless access terminals, including fixed wireless terminals, may be used. For the sake of simplicity, only mobile stations are shown and discussed hereafter. However, it should be understood that the use of the term "mobile station" in the claims and in the description below is intended to encompass the exemplary types of mobile stations described above, as well as portable devices such as, for example, vehicle-mounted wireless devices.

Dotted lines show the approximate boundaries of the cell sites 121–123 in which base stations 101–103 are located. The cell sites are shown approximately circular for the purposes of illustration and explanation only. It should be clearly understood that the cell sites may have other irregular shapes, depending on the cell configuration selected and natural and man-made obstructions.

As is well known in the art, cell sites 121–123 are comprised of a plurality of sectors (not shown), where a directional antenna coupled to the base station illuminates each sector. The embodiment of FIG. 1 illustrates the base station in the center of the cell. Alternate embodiments of the present invention may position the directional antennas in corners of the sectors. The system of the present invention is not limited to any particular cell site configuration.

In one embodiment of the present invention, BS 101, BS 102, and BS 103 comprise a base station controller (BSC) and at least one base transceiver subsystem (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystem in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101–103 and PDSN 150. PCF unit 190 may be implemented as part of PDSN 150, as part of base stations 101–103, or as a stand-alone device that communicates with PDSN 150, as shown in FIG. 1. Line 131 also provides the connection path to transfer control signals between MSC 140 and BS 101, BS 102 and BS 103 used to establish connections for voice and data circuits between MSC 140 and BS 101, BS 102 and BS 103.

Communication line 131 may be any suitable connection means, including a T1 line, a T3 line, a fiber optic link, or any other type of data connection. The connections on line 131 may transmit analog voice signals or digital voice signals in pulse code modulated (PCM) format, Internet Protocol (IP) format, asynchronous transfer mode (ATM) format, or the like. According to an advantageous embodiment of the present invention, line 131 also provides an Internet Protocol (IP) connection that transfers data packets between the base stations of wireless network 100, including BS 101, BS 102 and BS 103. Thus, line 131 comprises a local area network (LAN) that provides direct IP connections between base stations without using PDSN 150.

MSC 140 is a switching device that provides services and coordination between the subscribers in a wireless network and external networks, such as the PSTN or Internet. MSC 140 is well known to those skilled in the art. In an exemplary embodiment of the present invention, communications line 131 may be several different data links where each data link couples one of BS 101, BS 102 or BS 103 to MSC 140.

In the embodiment of wireless network 100 shown in FIG. 1, MS 111 and MS 112 are located in cell site 121 and communicate with BS 101. MS 113 is located in cell site 122 and communicates with BS 102 and MS 114 is located in cell site 123 and communicates with BS 103. MS 112 is located close to the edge of cell site 123 and moves in the direction of cell site 123, as indicated by the direction arrow proximate MS 112. At some point, as MS 112 moves into cell site 123 and out of cell site 121, a handoff will occur.

As is well known to those skilled in the art, the handoff procedure transfers control of a call from a first cell to a second cell. A handoff may be either a soft handoff or a hard handoff. In a soft handoff, a connection is made between the mobile station and the base station in the second cell before the existing connection is broken between the mobile station and the base station in the first cell. In a hard handoff, the existing connection between the mobile station and the base station in the first cell is broken before a new connection is made between the mobile station and the base station in the second cell.

As MS 112 moves from cell 121 to cell 123, MS 112 detects the pilot signal from BS 103 and sends a Pilot Strength Measurement Message to BS 101. When the strength of the pilot transmitted by BS 103 and received and reported by MS 112 exceeds a threshold, BS 101 initiates a soft handoff process by signaling the target BS 103 that a handoff is required as described in TIA/EIA IS-95 or TIA/EIA IS-2000.

BS 103 and MS 112 proceed to negotiate establishment of a communications link in the CDMA channel. Following establishment of the communications link between BS 103 and MS 112, MS 112 communicates with both BS 101 and BS 103 in a soft handoff mode. Those acquainted with the art will recognize that soft hand-off improves the performance on both forward (BS to MS) channel and reverse (MS to BS) channel links. When the signal from BS 101 falls below a predetermined signal strength threshold, MS 112 may then drop the link with BS 101 and only receive signals from BS 103. The call is thereby seamlessly transferred from BS 101 to BS 103. The above-described soft handoff assumes the mobile station is in a voice or data call. An idle handoff is the hand-off between cell sites of a mobile station that is communicating in the control or paging channel.

A conventional CDMA2000 wireless network normally uses the auxiliary pilot (AP) channel as a phase reference for coherent demodulation in the forward channel. According to the principles of the present invention, wireless network 100 uses beam-forming techniques to transmit a sweeping Auxiliary Pilot (AP) channel signal in a sector. Each mobile station in each sector transmits multiple Pilot Signal Measurement messages (PSMMs) to the base station. Each PSMM transmitted by a given mobile station includes the received signal strength of an associated beam of the AP signal. The base station is able to match each PSMM with a transmitted beam of the AP signal. The direction of the AP signal beam that results in the strongest received signal in the mobile station determines the direction of the mobile station.

The use of the Auxiliary Pilot (AP) can be beneficial in a smart antenna base transceiver subsystem (BTS), but the gain may vary. The benefits of using the AP signal may be outweighed by the additional transmit power required for the AP signal. The present invention provides for making beneficial use of the AP channel.

In an exemplary embodiment, the AP channel signal is transmitted at a power level such that the mobile station receives the AP signal at a C/I level that is marginally above the T_ADD value to ensure that the AP signal remains in the active set. In a typical CDMA2000 network, the T_ADD value is approximately −15 dB relative to the main pilot. The PSMM message from the mobile station reports when the AP signal is in the active set.

An exemplary embodiment of the present invention provides three modes (choices) for operating the AP signal for direction finding purposes:

Mode 1—Do not use AP signal (conventional operation).
Mode 2—Use the AP signal at all times. The BS should force the mobile to hand off to the AP.
Mode 3—Use the AP in switched mode. Do not hand off to the AP and instead transmit traffic on a narrow beam that is phase matched to the sector pilot channel signal.

The choice as to which mode to operate in depends on the environment. The exemplary embodiment of the present invention implements the following selection procedure:

1) Mode 1 is selected when the BS monitors many RAKE fingers with similar magnitude on the reverse link and the total transmit power associated with the use of AP is relatively large.
2) Mode 2 is selected when the BS monitors many RAKE fingers with similar magnitude on the reverse link and the total transmit power associated with the use of AP is relatively small.
3) Mode 3 is selected when few RAKE fingers are monitored on the reverse link and there is one clear dominant RAKE finger.

In the exemplary embodiment, the choice between Mode 1 and Mode 2 is made as follows:

Initial_AP_Tx_Power=Sector_Pilot_Tx_Power+T_ADD−Narrow_BeamGain;
Total_Power_Without_AP=Current_TrafficChannel_Power;
Total_Power_With_AP=Current_TrafficChannel_Power−Narrow_BeamGain+Initial_AP_Tx_Power In the exemplary embodiment of the present invention, Mode 2 is selected when:
Total_Power_Without_AP>Total_Power_With_AP.

Otherwise, Mode 1 is selected. This can be restated as:
Choose Mode 2 if:
0>Sector_Pilot_Tx_Power+T_ADD−2*Narrow_BeamGain.
Otherwise, choose Mode 1.

Conventional mobile stations measure the PILOT_STRENGTH in dB and the PILOT_PN_PHASE, which latter is the Time of Arrival (TOA) value measured in number of chips. These measurements are included in the Pilot Strength Measurement Message (PSMM). In a multi-path environment, it is unlikely that two multi-paths would arrive at the mobile station with the same strength and TOA values. These two criteria are therefore considered to uniquely identify the strongest multi-path component of that pilot signal.

The exemplary embodiment of the present invention uses the following procedure to phase match the AP signal to the sector pilot signal (Mode 3). The narrow beam that would most closely create the same multi-path as the wide beam (sector) pilot signal (as identified by the aforementioned two criteria) must be the narrow beam most similar to the wide beam in that scattering area. This narrow beam is, therefore, desirable for transmitting the traffic data. As mentioned above, the CMDA2000 standard uses the Auxiliary Pilot (AP) channel as a phase reference for coherent demodulation. However, the cost in terms of power to use a dedicated pilot for each mobile station could be prohibitive. Mode 3 therefore uses the AP with an On/Off mechanism (also referred to herein as switched mode), which is more economical in terms of transmission power.

Figure 2:
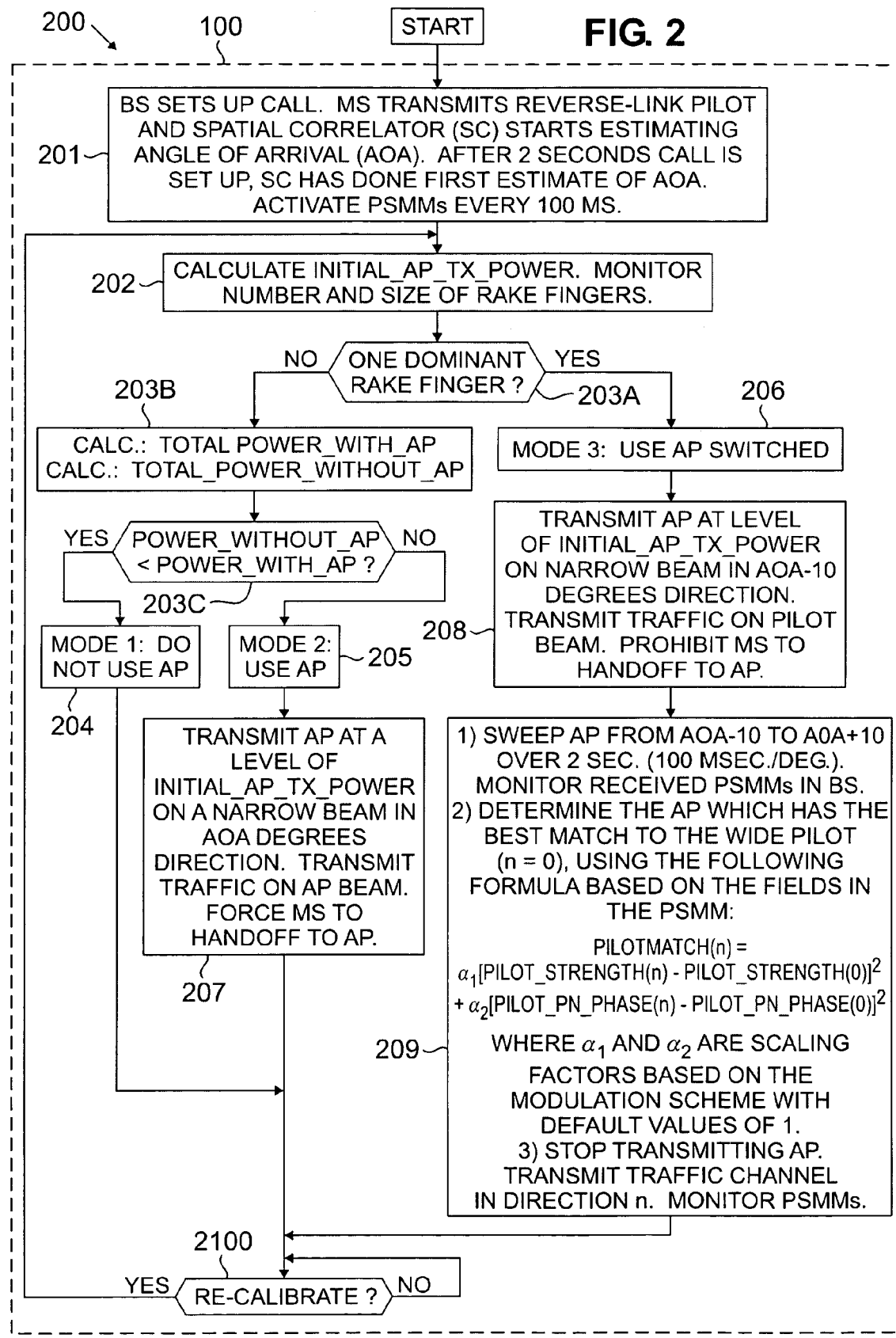
FIG. 2 is a flow diagram illustrating the use of an Auxiliary Pilot channel signal according to the principles of the present invention.

FIG. 2 depicts flow diagram 200, which illustrates the use of an Auxiliary Pilot channel signal according to the principles of the present invention. It is noted that there is an inverse relationship between the rate of PSMM messages (which load the reverse channel) and the length of time that the Auxiliary Pilot signal has to be on (loading the forward channel). It is expected that where the spatial correlator (SC) is accurate (e.g., when the mobile is far from the BTS or in a low-density area), the FIG. 2 procedures do not need to be repeated after call setup. Alternatively, if the channel changes too quickly, the base station either switches traffic to wide beam (switches to Mode 1), or permanently uses the Auxiliary Pilot channel signal (switches to Mode 2) and allows the mobile station to handoff to the Auxiliary Pilot.

In the example of FIG. 2, the mode is selected at process steps 203A, 203B and 203C, using the exemplary mode selection procedures described above. If Mode 2 is selected at process step 205, then Mode 2 is implemented at process step 207. In order to implement Mode 2, the base station starts transmitting the AP on a narrow beam in AOA degrees direction, and at a previously calculated level of initial AP transmit power (see also Initial_AP_TX_Power at process step 202). Then, the base station begins transmitting traffic on the AP beam, and forces the mobile station to hand off to the AP.

If Mode 3 is selected at process step 206, then Mode 3 is implemented at process steps 208 and 209. Mode 3 is implemented by first starting to transmit AP on a narrow beam in AOA −10 degrees direction (in this example), and at the previously calculated level of initial AP transmit power (see also Initial_AP_TX_Power at process step 202). The base station also transmits traffic on the sector pilot beam, and prohibits the mobile station from handing off to AP. At process step 209, the base station sweeps AP from AOA−10 degrees to AOA+10 degrees over a period of 2 seconds (100 milliseconds per degree in this example).

Monitoring the incoming PSMM messages, the base station can determine which AP provides the best match to the wide (sector) pilot. In particular, information from the received PSMM messages (PILOT_STRENGTH and PILOT_PN_PHASE) can be used to find the AP pilot that best matches the strongest multi-path associated with the sector pilot. With reference to where the parameter "n" is shown to take the value "0" at process step 209 in FIG. 2, this designates the strongest multi-path of the wide pilot. The remaining values of n designate the strength and phase measurements associated with the various angular directions assumed by the auxiliary pilot as it sweeps through the aforementioned angular distance. The AP that produces the smallest value of PilotMatch(n) at process step 209 is selected as the best match to the aforementioned strongest multi-path component of the wide pilot. As shown at process step 209 in FIG. 2, PilotMatch(n) provides a measure (in this example, a least squares approximation) of how closely the measured strength and phase of the nth AP signal compare to those same parameters of the strongest multi-path component of the sector (wide) pilot. Once the best-matching AP has been determined, transmission of the AP is terminated, and normal traffic channel transmission begins in the direction of that best AP match.

Examples of criteria (i.e., the calibration criteria at process step 2100 in FIG. 2) based on which the procedures in FIG. 2 could be repeated after call setup are as follows: 1) the DGU power increases substantially; 2) the PMRM reports excessive errors; 3) the SC detects a change in direction of more than 5 degrees; and 4) a change in the PSMM messages (Pilot_Strength and/or Pilot_PN_Phase) of the current pilot.

Figure 3:
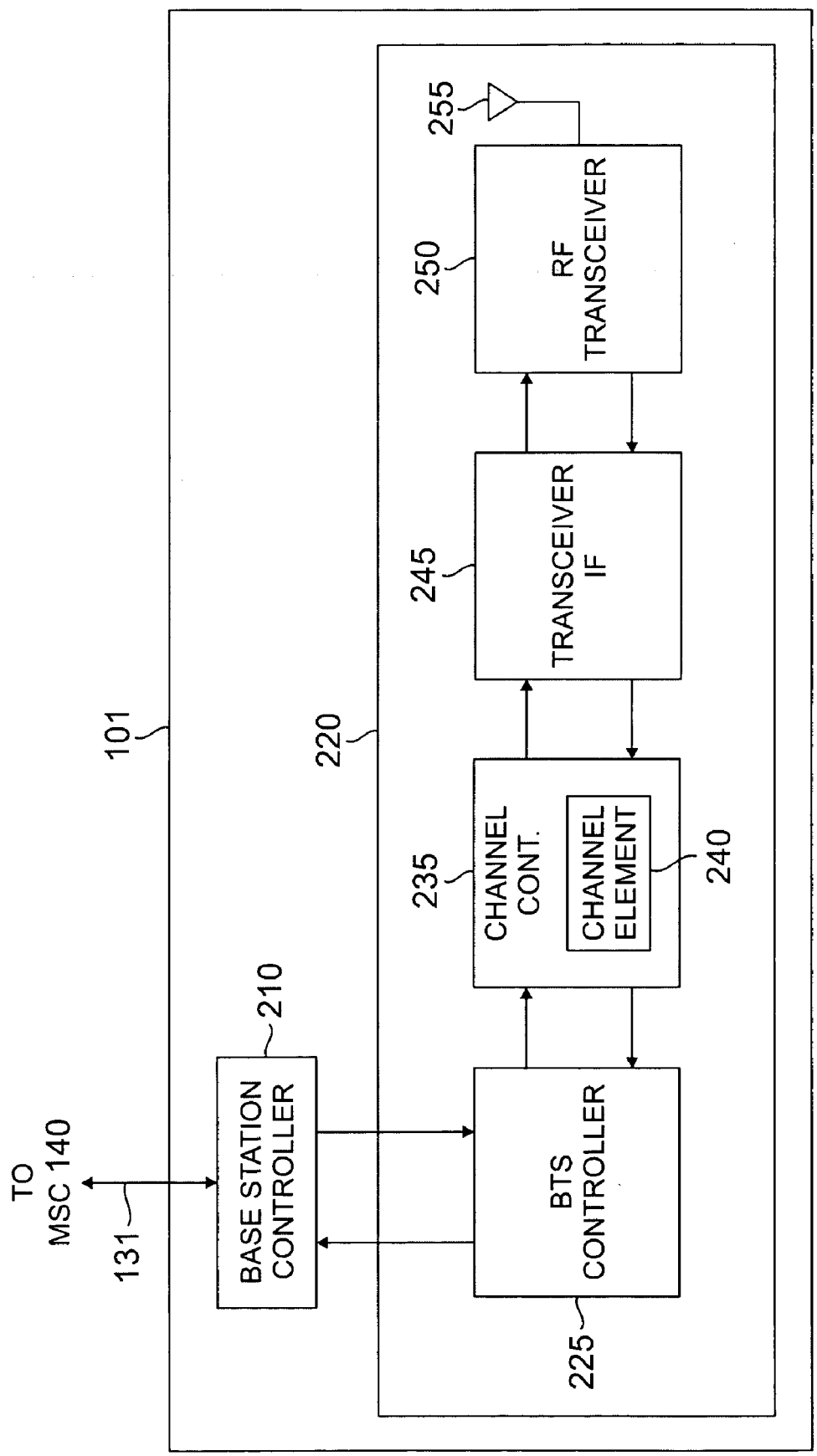
FIG. 3 illustrates an exemplary base station according to one embodiment of the present invention.

FIG. 3 illustrates exemplary base station 101 in greater detail according to an exemplary embodiment of the present invention. Base station 101 comprises base station controller (BSC) 210 and base transceiver station (BTS) 220. Base station controllers and base transceiver stations were described previously in connection with FIG. 1. BSC 210 manages the resources in cell site 121, including BTS 220. BTS 120 comprises BTS controller 225, channel controller 235 (which contains representative channel element 240), transceiver interface (IF) 245, RF transceiver unit 250, and antenna array 255.

BTS controller 225 comprises processing circuitry and memory capable of executing an operating program that controls the overall operation of BTS 220 and communicates with BSC 210. Under normal conditions, BTS controller 225 directs the operation of channel controller 235, which contains a number of channel elements, including channel element 240, that perform bi-directional communications in the forward channel and the reverse channel. A forward channel refers to outbound signals from the base station to the mobile station and a reverse channel refers to inbound signals from the mobile station to the base station. Transceiver IF 245 transfers the bi-directional channel signals between channel controller 240 and RF transceiver unit 250.

BTS controller 225 also controls beam-forming operations in antenna array 255 according to the principles of the present invention. In an exemplary embodiment, BTS controller 225 performs the AP mode selection operation illustrated in FIG. 2. BTS controller 225 receives the measured AP signal parameters and monitors the RAKE finger measurements as described in FIG. 2. BTS controller 225 also performs the mode selection algorithm set form in FIG. 2.

Antenna array 255 transmits forward channel signals received from RF transceiver unit 250 to mobile stations in the coverage area of BS 101. Antenna array 255 also sends to transceiver 250 reverse channel signals received from mobile stations in the coverage area of BS 101. In a preferred embodiment of the present invention, antenna array 255 is multi-sector antenna, such as a three-sector antenna in which each antenna sector is responsible for transmitting and receiving in a 120° arc of coverage area. Additionally, transceiver 250 may contain an antenna selection unit to select among different antennas in antenna array 255 during both transmit and receive operations.

Figure 4:
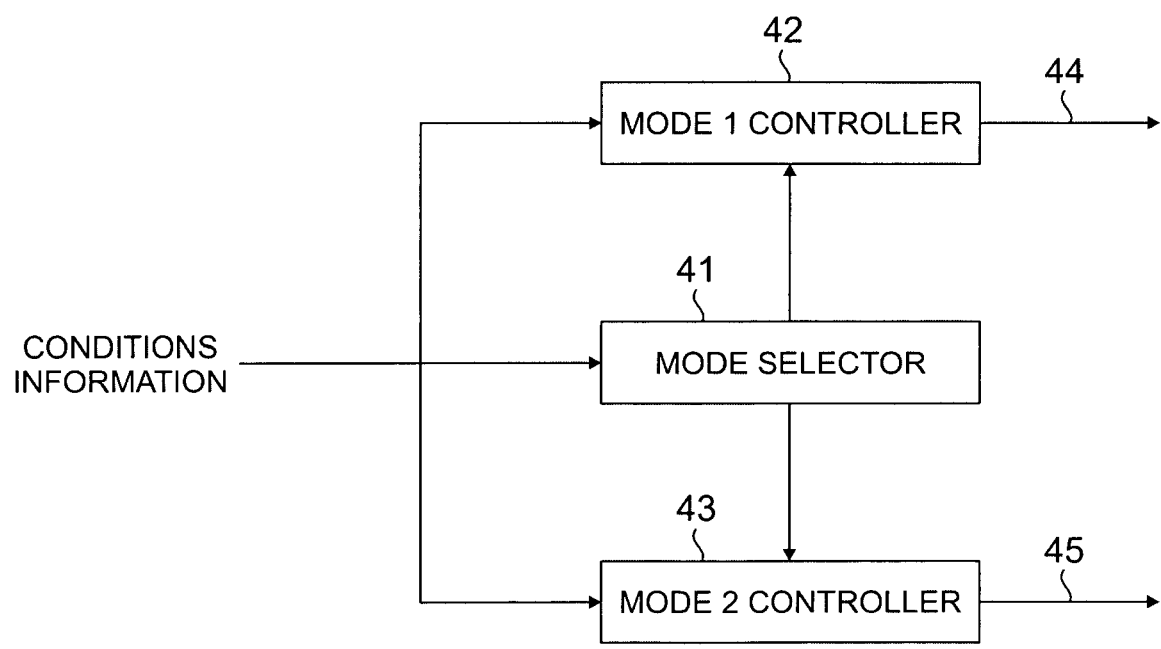
FIG. 4 illustrates a selected portion of the exemplary base station in FIG. 3 in more detail according to an exemplary embodiment of the invention.

FIG. 4 diagrammatically illustrates pertinent portions of exemplary BTS controller 225 of FIG. 3. In FIG. 4, mode selector 41 may enable either Mode 1 controller 42 or Mode 2 controller 43 based on current conditions in the system. In one embodiment, mode selector 41 may select between Modes 1 and 2 based on the exemplary Mode 1/Mode 2 selection criteria described above and illustrated generally at process steps 203A through 206 in FIG. 2. In another embodiment, Mode 1 controller 42 may implement the exemplary Mode 1 operations described above and illustrated generally at process step 207 in FIG. 2. Mode 2 controller 43 may implement the exemplary Mode 2 operations described above and illustrated generally at process steps 208 and 209 in FIG. 2.

Each of mode selector 41 and mode controllers 42 and 43 receive and operate in response to appropriate input information indicative of current conditions in the system (e.g., AOA, PSMMs, RAKE information, etc.). Mode controllers 42 and 43 provide respective output signaling 44 and 45 which direct the operation of other conventional base station components (not explicitly shown in FIG. 4) in order to effectuate the desired operation.

The present invention is more accurate than the prior art techniques for making direction finding estimates, since the mobile station takes the measurements directly from the forward link. The ON/OFF mechanism for the AP signal in Mode 3 has a relatively minor cost in terms of power, while maintaining a good phase reference and without any modification to the mobile station.

Although the present invention has been described with an exemplary embodiment, various changes and modifications may be suggested to one skilled in the art.

What is claimed is:

1. For use in a wireless network capable of communicating with a plurality of mobile stations in a coverage area of said wireless network, a base station comprising:
   a controller for controlling use of an Auxiliary Pilot channel, wherein said controller is capable of causing said base station to i) terminate use of said Auxiliary Pilot channel in a first mode, ii) transmit data traffic to a first mobile station using said Auxiliary Pilot channel in a second mode, and iii) transmit data traffic to said first mobile station using a traffic channel phase-matched to a wide sector pilot channel signal in a third mode.

2. The base station as set forth in claim 1, wherein said base station monitors reverse channel signals from said first mobile station using a RAKE receiver and said controller is capable of determining if one of a plurality of RAKE fingers of said RAKE receiver is receiving a dominant signal.

3. The base station as set forth in claim 2, wherein said controller, in response to a determination that a first one of said plurality of RAKE fingers is receiving a dominant signal, causes said base station to transmit a plurality of Auxiliary Pilot channel signals to said first mobile station at different angles and wherein said controller is capable of determining a first one of said plurality of Auxiliary Pilot channel signals that is most closely phase-matched to said wide sector pilot channel signal.

4. The base station as set forth in claim 3, wherein said controller causes said base station to transmit said data traffic to said first mobile station using said traffic channel, wherein said controller configures said traffic channel using phase and power parameters similar to phase and power parameters associated with said first Auxiliary Pilot channel signal.

5. The base station as set forth in claim 2, wherein said controller, in response to a determination that none of said plurality of RAKE fingers is receiving a dominant signal, is further capable of determining: i) a first total transmit power required to transmit data traffic to said first mobile station if said Auxiliary Pilot channel is not used and ii) a second total transmit power required to transmit data traffic to said first mobile station if said Auxiliary Pilot channel is used.

6. The base station as set forth in claim 5, wherein said controller is further capable of determining if said first total transmit power is greater than said second total transmit power.

7. The base station as set forth in claim 6, wherein said controller, in response to a determination that said first total transmit power is greater than said second total transmit power, causes said base station to terminate use of said Auxiliary Pilot channel in said first mode.

8. The base station as set forth in claim 7, wherein said controller, in response to a determination that said first total transmit power is not greater than said second total transmit power, causes said base station to transmit said data traffic to said first mobile station using said Auxiliary Pilot channel in said second mode.

9. A wireless network comprising a plurality of base stations capable of communicating with a plurality of mobile stations in a coverage area of said wireless network, wherein a first one of said base station comprises:
   a controller for controlling use of an Auxiliary Pilot channel, wherein said controller is capable of causing said base station to i) terminate use of said Auxiliary Pilot channel in a first mode, ii) transmit data traffic to a first mobile station using said Auxiliary Pilot channel in a second mode, and iii) transmit data traffic to said first mobile station using a traffic channel phase-matched to a wide sector pilot channel signal in a third mode.

10. The wireless network as set forth in claim 9, wherein said base station monitors reverse channel signals from said first mobile station using a RAKE receiver and said controller is capable of determining if one of a plurality of RAKE fingers of said RAKE receiver is receiving a dominant signal.

11. The wireless network as set forth in claim 10, wherein said controller, in response to a determination that a first one of said plurality of RAKE fingers is receiving a dominant signal, causes said base station to transmit a plurality of Auxiliary Pilot channel signals to said first mobile station at different angles and wherein said controller is capable of determining a first one of said plurality of Auxiliary Pilot channel signals that is most closely phase-matched to said wide sector pilot channel signal.

12. The wireless network as set forth in claim 11, wherein said controller causes said base station to transmit said data traffic to said first mobile station using said traffic channel, wherein said controller configures said traffic channel using phase and power parameters similar to phase and power parameters associated with said first Auxiliary Pilot channel signal.

13. The wireless network as set forth in claim 10, wherein said controller, in response to a determination that none of said plurality of RAKE fingers is receiving a dominant signal, is further capable of determining: i) a first total transmit power required to transmit data traffic to said first mobile station if said Auxiliary Pilot channel is not used and ii) a second total transmit power required to transmit data traffic to said first mobile station if said Auxiliary Pilot channel is used.

14. The wireless network as set forth in claim 13, wherein said controller is further capable of determining if said first total transmit power is greater than said second total transmit power.

15. The wireless network as set forth in claim 14, wherein said controller, in response to a determination that said first total transmit power is greater than said second total transmit power, causes said base station to terminate use of said Auxiliary Pilot channel in said first mode.

16. The wireless network as set forth in claim 15, wherein said controller, in response to a determination that said first total transmit power is not greater than said second total transmit power, causes said base station to transmit said data traffic to said first mobile station using said Auxiliary Pilot channel in said second mode.

17. For use in a wireless network capable of communicating with a plurality of mobile stations in a coverage area of the wireless network, a method of controlling the use of an Auxiliary Pilot channel comprising the steps of:

monitoring reverse channel signals from a first mobile station using a RAKE receiver;

determining if one of a plurality of RAKE fingers of the RAKE receiver is receiving a dominant signal;

in response to a determination that a first RAKE finger is receiving a dominant signal, transmitting a plurality of Auxiliary Pilot channel signals to the first mobile station at different angles;

determining a first one of the plurality of Auxiliary Pilot channel signals that is most closely phase-matched to a wide sector pilot channel signal; and transmitting data traffic to the first mobile station using a traffic channel phase-matched to the wide sector pilot channel signal.

18. The method as set forth in claim 17, further comprising, in response to a determination that none of the plurality of RAKE fingers is receiving a dominant signal, the steps of:

determining a first total transmit power required to transmit data traffic to the first mobile station if the Auxiliary Pilot channel is not used; and determining a second total transmit power required to transmit data traffic to the first mobile station if the Auxiliary Pilot channel is used.

19. The method as set forth in claim 18, further comprising the step of determining if the first total transmit power is greater than the second total transmit power.

20. The method as set forth in claim 19, further comprising, in response to a determination that the first total transmit power is greater than the second total transmit power, the step of terminating use of the Auxiliary Pilot channel.

21. The method as set forth in claim 20, in response to a determination that the first total transmit power is not greater than the second total transmit power, the step of transmitting the data traffic to the first mobile station using the Auxiliary Pilot channel in the second mode.

* * * * *